Aug. 2, 1966  B. H. HEEPS  3,264,557
METHOD AND APPARATUS FOR DETECTING AND MEASURING MINUTE
QUANTITIES OF WATER PRESENT IN LIQUID
HYDROCARBON FUELS
Filed Dec. 6, 1961  3 Sheets-Sheet 1
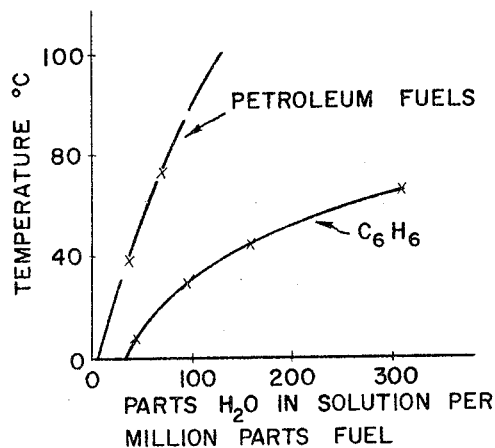
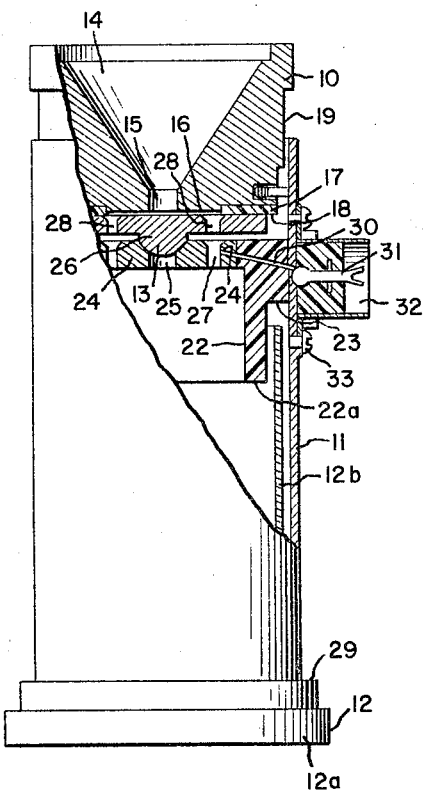
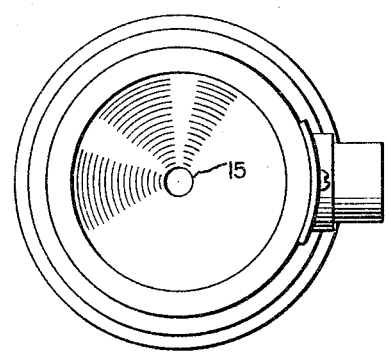
INVENTOR
BRIAN H. HEEPS
BY Wenderoth, Lind & Ponack
ATTORNEYS Aug. 2, 1966   B. H. HEEPS   3,264,557
METHOD AND APPARATUS FOR DETECTING AND MEASURING MINUTE
QUANTITIES OF WATER PRESENT IN LIQUID
HYDROCARBON FUELS
Filed Dec. 6, 1961   3 Sheets-Sheet 2
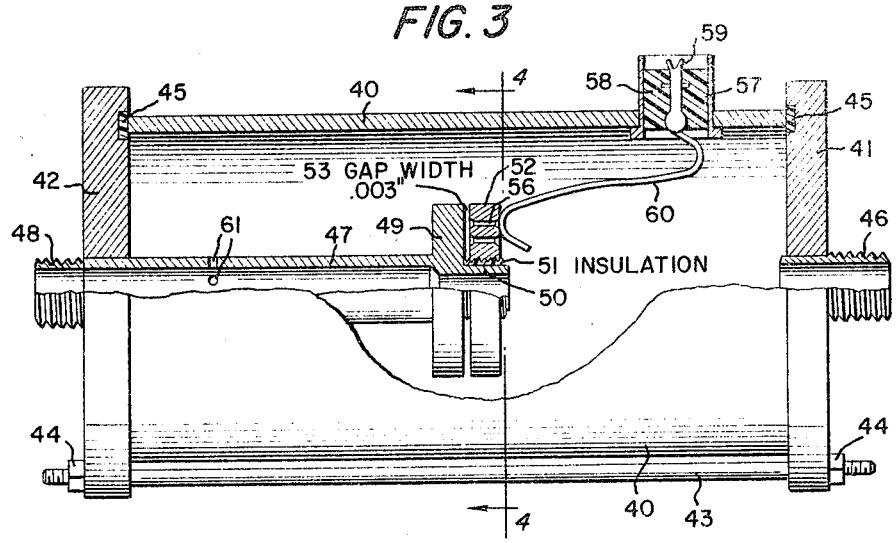
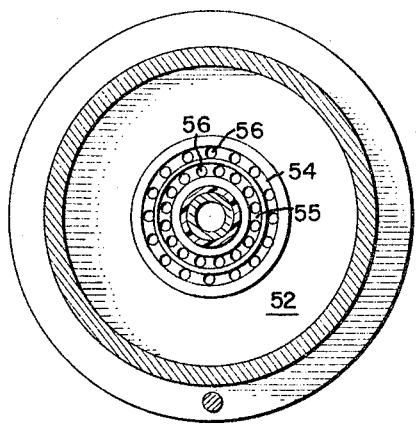
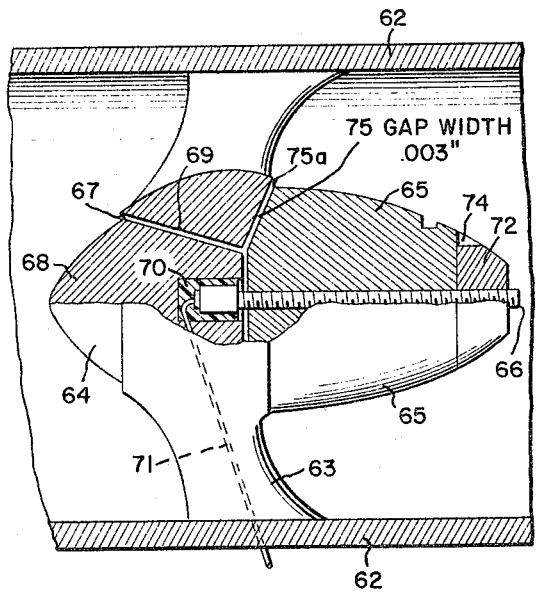
INVENTOR
BRIAN H. HEEPS
BY Wenderoth, Lind & Ponack
ATTORNEYS

INVENTOR
BRIAN H. HEEPS

ATTORNEYS

United States Patent Office 3,264,557
Patented August 2, 1966

3,264,557
METHOD AND APPARATUS FOR DETECTING AND MEASURING MINUTE QUANTITIES OF WATER PRESENT IN LIQUID HYDROCARBON FUELS
Brian Hamilton Heeps, 26A Alfada St., South Caulfield, Victoria, Australia
Filed Dec. 6, 1961, Ser. No. 157,888
13 Claims. (Cl. 324—65)

This invention relates to detection and measurement of minute quantities of water in hydrocarbon fuels, but it may be applied to the detection of water in other liquids with which water is immiscible.

With the development of high performance automotive and aircraft engines it is becoming increasingly important to use high grade fuels having a water content known to be below a specified maximum. In modern aircraft, for example, water droplets can often build up on filter meshes until they freeze and block the filter or until they are forced through the filter in a sudden rush, the consequences in either case are frequently serious. However, up until the present time, there has been no convenient method by which the quality of suspended water and fuels can be measured in the field to the order of 100 or 200 parts per million parts of fuel (p.p.m.). In most cases no attempt is made to take a direct measurement of water content, the fuel simply being pumped into settling tanks and allowed to stand for a specified period. However, high pressure re-filling techniques disperse the water evenly through the field in the form of microscopic particles or droplets which not only take a long time to settle, but cannot easily be detected.

Until the development of my invention, there has been, to my knowledge, considerable difficulty in the measurement of minute quantities (below say 50 p.p.m.) of water in fuel, even where such investigations are made in laboratories equipped for infra-red absorption, optical dispersion and spectroscopic techniques. In spite of this fact, it is becoming increasingly necessary to measure such quantities of water in fuels and to make such measurements by simple and reliable means which may be used without difficulty and by unskilled personnel "on location."

It is therefore an object of my invention to provide a simple reliable method by which minute quantities of water in fuel can be acccurately and conveniently measured.

Another object is to provide apparatus which may be incorporated in fuel lines, fuel tanks or the like which will provide a warning signal or indication should the proportion of water within the fuel rise above a specified maximum level.

Yet another object of my invention is to provide a simple and accurate device by which samples of fuel can be tested for water content and by which a relative or absolute estimate of the water contained in the fuel in parts may be obtained.

Other objects, features and advantages of my invention will be apparent from the following description made with reference to the accompanying drawings and illustrating various particular forms which the invention may take. In the accompanying drawings:

FIGURE 1 is a graph showing the general relationship between the solubility of water in hydrocarbons and temperatures;

FIGURE 2 is a cut away sectional view of a fuel testing device according to this invention;

FIGURE 2A is a plan view of the device shown in FIGURE 2;

FIGURE 3 is a part sectional view of apparatus for the detection of micro-particles of water within a hydrocarbon fuel as it flows at a comparatively low rate through a small pipe line;

FIGURE 4 is an end elevational view of portion of FIGURE 3 taken along the section plane 4—4 of FIGURE 3;

FIGURE 5 illustrates a part sectional view of apparatus for use in the detection of micro-particles of water within a hydrocarbon fuel which flows in comparatively large quantities through a large diameter fuel line;

Figure 6:
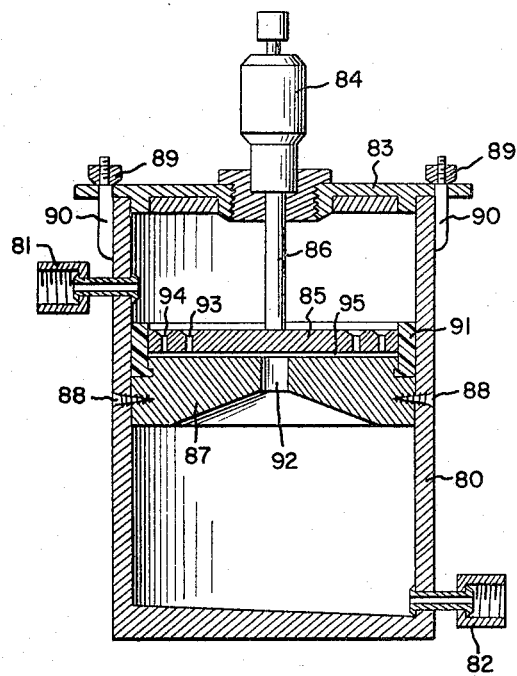
FIGURE 6 illustrates a sectional view of apparatus formed in accordance with the invention which not only detects the presence of micro-particles of water within a hydrocarbon fuel but also indicates the quantity of water present within the fuel in terms of gap size.

During my investigation of the problem of this invention I was able to collect figures from various tests relating the solubility of water in benzene and petroleum fuels to temperature; the graph of FIGURE 1 shows typical curves derived from such figures and it will be seen that solubility increases with temperature. This characteristic provides a clue to the serious nature of the problem of water in aviation fuel since, although every attempt may be made to keep the water content of the fuel at a minimum in ground storage tanks under normal atmospheric conditions, when the aircraft is flying at high altitude and the temperature of the fuel falls, the amount of water in solution decreases and the amount of water in suspension increases. Naturally, the water in solution is no problem as it is not in sufficient quantities to affect the burning of the fuel and it cannot block filters or other similar devices: this is not so, however, for water in suspension which can be present in dangerous quantities both from the point of view of efficient combustion and of filter blockage etc. Therefore, if such fuel is being used in aircraft purposes, the safe amount of suspended water is considerably less than that tolerable at high temperature conditions.

Referring more particularly to FIGURES 2 and 2A of the accompanying drawings, it will be seen that the fuel sample test device of this invention is basically simple and straightforward. It consists of a funnel-like head 10 a tubular body 11, a cup-like base 12 and a detector plate 13. The aforementioned components may be formed from a suitable metal such as brass and, preferably chrome-plated to facilitate cleaning and to provide hard and accurate surfaces.

The head 10 may be formed by turning from solid brass so as to provide a central conical funnel-like depression 14 leading to a central lower hole 15, the depression 14 and hole 15 being proportioned so that a 10 mil sample of fuel may be accommodated therein. It is, of course possible to form the head so that larger samples can be taken. An annular boss or projection 16 is turned on the bottom face of the head 10 so as to lie concentrically with the hole 15. Firmly bonded to the bottom surface of the head 10 is an annular plate-like sheet of hard insulating material 17 which is unaffected by the fuel or water Such a material may, for example, be formed from polyvinyl chloride or celluloid. The insulating material 17 surrounds the boss 16 and is turned so that it projects beyond the lower face of the boss 16, a precisely known amount (usually between two and three thousandths of an inch) so that the boss 16 is spaced accurately from the plate 13 when the head 10 is in position within the body 11. To enhance the accuracy of the spacing of the head 10 from the plate 13, the area of contact between the insulating material 17 and the plate 13 is reduced by turning back portion of the insulating material as shown by the reference 18. Finally, the external diameter of the main portion 19 of the head is turned down so that the head slides easily within the upper portion of the tubular body 11, good electrical contact being maintained between the head 10 and the body 11 by means of the spring loaded plunger 20 and the spacing clip-ring 21.

The body 11 of the device is of very simple design, being formed from a length of chrome-plated brass tube within which is firmly fixed a hollow cylindrical bush 22 of insulating material such as Bakelite. The outer lower periphery of the bush 22 is turned down to provide a step or shoulder 23, while the upper portion of the bush 22 has a metal insert 24 forced therein. Insert 24 provides an electrically conducting base on which the detector plate 13 can rest, has a central hole 25 adapted to locate the boss 26 of the plate 13, and has a ring of holes 27 surrounds in the central hole 25 and corresponding in pitch circle diameter with the ring of holes 28 provided in the detector plate 13. As will be seen from FIGURE 2 the pitch circle diameter of the aforementioned rings of holes is slightly smaller than the larger diameter of the boss 16.

A further inspection of FIGURE 2 will also indicate that the cup 12 has a base 12a and a tubular stem 12b, the base 12a having an annular step 29 formed thereon upon which the lower end of the tubular body 11 normally sits and the stem 12b projecting beyond and outside of the skirt 22a of the insulating bush 22. Thus, any fuel which is poured into the funnel-like head 10 will all pass into the cup 12. The detector plate 13 has a diameter substantially less than that of the tubular body 11 and has its upper face machined accurately flat and, as previously indicated, is provided with a central downwardly projecting boss 26 on its lower face which, by co-operation with the bell-mouth of hole 25, locates the plate 13. Finally, the insert 24 is electrically connected by conductor 30 to the center terminal 31 of a co-axial plug assembly 32 which is screwed to the wall of the body 11 by screws 33 so that the resistance between the plate 13 and the head 10 may be measured.

FIGURES 3 and 4 of the accompanying drawings illustrate apparatus which may be used in a fuel line, for example, between a fuel tank and an engine, so as to give a warning when the water content of the fuel becomes dangerously high. This embodiment of the invention is housed in a tubular casing 40 sealed at either end by the end plates 41 and 42 which are drawn together against the casing 40 by means of the stays 43 and their associated nuts 44. A liquid-tight joint between the casing end and the end plates 41 and 42 is formed by providing annular washers 45 within grooves in the inner faces of the end plates so that the casing may abut therewith. A tubular externally threaded inlet nipple 46 is located in the centre of the end plate 41 and is welded or brazed thereto so as to provide a connection between a pipe line and the apparatus.

The outlet of the apparatus is formed from a length of piping 47 which projects through the end plate 42 so as to form the externally threaded outlet nipple 48 of the apparatus. The pipe 47 may be welded or brazed to the end plate 42 so as to be fixed so that it projects into the casing 40 and lies co-axially therewithin. The internal diameter of the pipe 47 is equal to that of the fuel line and it projects forwardly into the casing 40 for some distance terminating in an integral flange 49. (In this particular embodiment the length of the pipe 47 contained within the casing 40 is approximately half the length of the casing 40 itself.) A short portion 50 of the pipe 47 projects forwardly beyond the flange 49 and is provided with an externally threaded sleeve 51 formed of insulating material and firmly affixed, by moulding or other suitable means, to the outer surface of the portion 50.

In this particular embodiment of the invention the casing end plates and piping are formed from brass or any other suitable metal and the insulating bush may be formed from any suitable plastic material which is unaffected by the fuel, for example neoprene.

A brass disc 52 having a diameter approximately equal to the diameter of the flange 49 is centrally bored and internally threaded to take the thread on the insulating bush 51 and is screwed thereon. Preferably, the brass disc 52 is a tight fit on the bush 51 and it is screwed onto the bush so that its rear surface lies parallel and close to the forward surface of the flange 49 but does not touch it. Thus the disc 52 and the flange 49 are separated by a narrow annular slot-like passage 53. The brass disc 52 is provided with two annular grooves 54 and 55 spaced radially apart in its forward face. These annular grooves and the rest of the forward face of the disc may be best seen from FIGURE 2 of the accompanying drawings which illustrates the end elevation of the disc 52 taken on plane 4—4 shown in FIGURE 3. A large number of small diameter holes 56 are drilled axially through the brass disc 52, each hole commencing in either one of the annular grooves 54 or 55.

As previously indicated, both the disc 52 and the flange 49 are of substantially the same diameter and are circular and it may be preferable to form them of a diameter which is only slightly less than the internal diameter of the casing 40. On the other hand, it is preferable to form the disc 52 and the flange 49 of a diameter which is considerably smaller than that of the casing 40 as illustrated in FIGURE 3 of the accompanying drawings. If a large diameter disc and flange are used it may be convenient to provide one or more additional annular grooves and to drill the disc with another series of small diameter holes similar to those already described. In any event, the diameter of the holes 56 (and the holes 28 in the device of FIGURE 1) need not be of the same order as the diameter of the anticipated micro-droplets of water (which may be in the order of a few thousandths of an inch). In this particular embodiment of the invention it is convenient to form these holes with a diameter between one-thirty-second and three-thirty-seconds of an inch so that, in comparison with the flow within the slot 53, the liquid flow within the holes 56 is comparatively free and unretarded.

An electrical co-axial socket assembly 57 is formed in the wall of the casing 40 just forward of the forward end of the internal pipe 47 and just behind the forward end plate 41. As before, the connector is fixed to the wall of the casing 40 and filled with an insulating material 58 which firmly locates the central conductive pin 59. The internal end of the central pin 59 in turn firmly locates one end of a Phosphor-bronze spring contact finger 60 the other end of which bears firmly against the disc 52 so as to locate it angularly while the apparatus is in use and so as to establish an electrical connection between the disc 52 and the pin 59.

In order to ensure that a certain portion of the fuel which passes through the casing 40 also passes through the holes 56 in the disc 52, a number of holes 61 are drilled in the pipe 47 between the end plate 42 and the flange 49. These holes 61 serve to reduce the fuel pressure at the outlet end of the casing behind the flange 49 so that a small part of fuel continually passes through the holes 56. Thus a given percentage of fuel will flow through the axial passages 56 in the disc 52 and turn into the narrow gap 53 between the flange 49 and the disc 52 from whence it is free to pass radially outwards into the outlet end of the casing 40.

FIGURE 5 of the accompanying drawings illustrates a part sectional view of the apparatus for detecting the presence of micro-particles of water in a hydrocarbon fuel which may be used in connection with a fuel line which, in comparison with the fuel line discussed in respect of FIGURE 3, carries large quantities of fuel.

Such a fuel line may be used in connection with the transfer of fuel from ground tanks to the tanks of aircraft or the transfer of fuel from one ground tank to another.

In this example, the apparatus is arranged within a section 62 of the fuel pipe and has the general form of a torpedo which is mounted centrally and co-axially with respect to the pipe 62 by means of the vanes 63. Once again, the body of the apparatus is divided into two portions; a front portion 64 and a rear portion 65. The front portion 64 is formed integrally with the vanes 63 and is fixed with respect to the pipe 62 while the rear portion 65 is attached to the front portion 64 by means of the screw thread formed on the rearwardly projecting stud 66 housed in the body 64.

The fixed part of the body 64 is provided on its front face with an annular groove 67 around the nose portion 68 thereof and a number of small holes 69 pass from the groove 67 rearwardly through the body to open out at the rear face of the fixed portion of the body 64. Although the holes 69 serve exactly the same purpose as the holes 28 and 56 described with respect to FIGURES 2 and 3, they do not pass axially through the fixed portion of the body 64 but slope inwardly towards its axis so that they open out on the rear face of the body on the circumference of a circle of a diameter condiserably smaller than the diameter of the annular groove 67. The rear face of the body portion 64 is counter-bored centrally so as to take an insulating bush 70 in which the rearwardly projecting metallic stud 66 is firmly embedded. The forward end of the stud 66 is connected to an insulated lead 71 which passes through one of the vanes 63, and the wall of the pipe 62 to a suitable electrical device such as that described with respect to FIGURE 8. The rear face of the fixed portion of the body 64 is conically concave having a flat radial central portion and sloping side.

The moveable or rear portion 65 of the body is, as previously described screwed on to the rear end of the stud 66 and it is locked in position by means of the lock nut 72, the lock nut 72 and the body portion 75 being turnable by means of a C-spanner which engages within the slots 73 and 74 respectively. The forward face of the body portion 65 is externally conical having sloping sides and a flat face corresponding to the shape of the rear face of the forward portion 64 of the body. The two sets of sloping faces are parallel and may be arranged closely adjacent to one another so as to form a small annular gap 75 therebetween which opens out as an annular groove 75a of a diameter slightly larger than the body portion 65 and therefore surrounds this portion 65 as indicated.

Referring now to FIGURE 6 of the accompanying drawings, the apparatus basically comprises a container 80 having an inlet pipe-coupling 81 and an outlet pipe-coupling 82 arranged near its top and bottom respectively, a lid or cap 83 formed from a hard insulating material and within which a micrometer head 84 is secured, and a disc 85 secured to the micrometer spindle 86 which may be raised or lowered with respect to a fixed plate 87. The container 80 is preferably cylindrical in form and has the plate 87 secured by means of the screws 88 to the interior thereof approximately half way up so that the upper surface of the plate 87 is at right angles to the vertical axis of the container 80.

The cap 83 is formed so that it is located accurately with respect to the container 80 in a liquid tight manner and is secured in position by means of the thumb-screws 89 which co-operate with the threaded pins 90 secured to the upper portion of the outside of the container 80 at intervals around its periphery. In this embodiment the cap 83 is formed from a hard thermo-setting plastic material which may be accurately formed and insulates the micrometer head 84 from the container 80. A resilient tubular insulating bush 91 is located by its bottom end in the plate 87 and surrounds the outer periphery of the disc 85 so that very little liquid may pass between the periphery of the disc and the wall of the container 80. However, care should be taken to ensure that the bushing 91 does not interfere in any way with the movement of the disc 85. The plate 87 has a central hole 92 formed therein through which any liquid in the upper portion of the container may flow to the lower portion thereof.

The disc 85 is similar in many respects to the disc described with respect to FIGURES 3 and 4 excepting that no central hole is provided therein and a greater or smaller number of annular grooves and rings of holes 93 and 94 respectively are provided therein. From a consideration of the foregoing description the operation of this device will be obvious since the test sample of hydrocarbon fuel is merely passed (preferably by gravity feed) through the container 80. In order to pass from the upper portion of the container 80 to the lower portion thereof it must flow through the holes 93 and 94 and the horizontal gap 95 in order to reach the central hole 92 in the plate 87. In this case the electric apparatus is connected to the micrometer head 84 and to the container 80 and the resistance between these two elements is measured. While the sample of fuel is flowing through the container, the micrometer head is moved so as to raise or lower the disc 85 so that an accurate reading of the maximum gap width for which a low resistance indication is obtained may be found.

Figure 7:
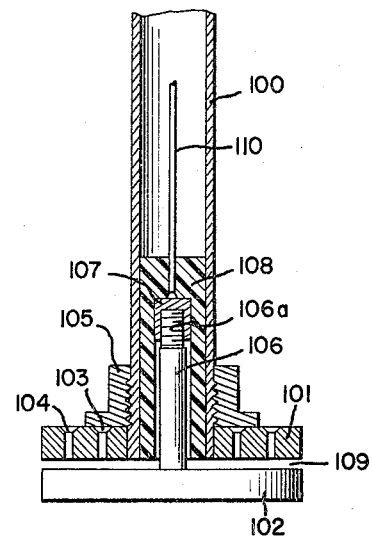
FIGURE 7 is a sectional elevation view of a device formed in accordance with the invention which is adapted to be dipped into the fuel and to thereby measure the water content.

Finally, referring to FIGURE 7, a form of the invention is illustrated which is suitable for dip-measurements taken in tanks of fuel. The tubular body 100 is attached to a suitable dip-stick or rod so that the fixed plate 101 and the movable plate 102 may be raised and lowered thereby. The fixed metallic plate 101 is secured in any suitable way to the bottom of the tube 100 and is provided with the two circles of holes 103 and 104, one of which 103 may be blanked off by the cover 105 which is screwed onto the exterior of the tube 100. A metal spindle 106 is attached to or formed integrally with the fixed plate 102 and extends upwardly and centrally therefrom to terminate in the threaded portion 106a which co-operates with an internally threaded metallic bush 107 firmly embedded in an insulating plug 108 which blocks the end of the tube 100 and is drilled to take the spindle 106. Thus, the plate 102 is electrically insulated from the tube 100 and the resistance of the gap 109 can be measured by measuring the resistance between the lead 110 and the tube 100.

Figure 8:
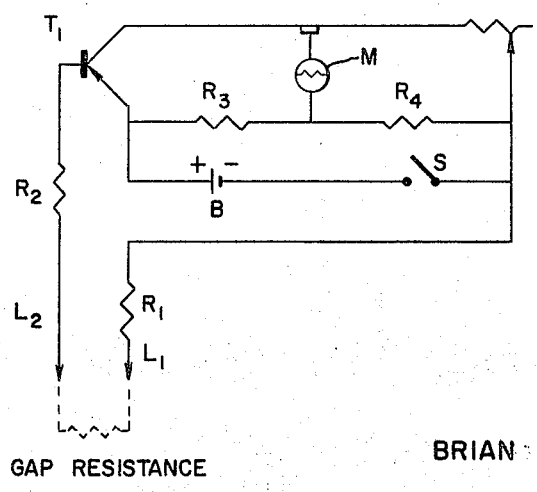
FIGURE 8 is a circuit diagram of a typical electronic detector unit which is suitable for use in connection with the various devices of this invention.

Although the electronic circuit which is adapted to measure the resistance of the gap in each of the above cases forms no essential part of this invention, it is important that the voltage which is applied across the plates in each case is low, usually below 10 volts. The actual circuit may be any electronic circuit adapted to apply this voltage and to amplify and measure the current flow, an indicator, meter, value or other device being driven by the amplified current or a relay energized thereby. A typical single-stage circuit is shown in FIGURE 8 but it should be understood that this circuit can be modified by the addition of further amplifier stages or the modification of the circuitry to provide the desired meter scaling. Basically, however, the circuit consists of a single PNP transistor $T_1$ connected as an amplifier, having its collector connected to the negative terminal of battery B via the zero-set potentiometer P and switch S, the emitter of $T_1$ being connected to the positive terminal of the battery B. The negative terminal of the battery is also connected (via the switch S) to the current limiting resistor $R_1$ from which a lead $L_1$ may be passed to one of the detecting electrodes or plates of the apparatus shown in any one of the foregoing figures. The other lead $L_2$ is connected via the limiting resistor $R_2$ to the base of $T_1$. As indicated in FIGURE 8 the meter M is connected between the collector and emitter of $T_1$, the balance or arm resistors $R_3$ and $R_4$ being interposed on the positive side of the meter connection.

An inspection of FIGURE 8 will show that the battery voltage of 1.5 volts is applied between the leads $L_1$ and $L_2$ i.e. across the gap resistance RG (shown dotted) present when the circuit is connected to one of the foregoing devices. A small current in the order of a few micro-amps will be permitted to flow through the high gap resistance RG and a much larger current will then flow in the collector-emitter circuit of $T_1$, the arrangement being such that a current of say 10 micro-amps through the emitter-base circuit will cause a full scale deflection of the meter M.

Although, various devices have been shown as different embodiments of the invention all have a common principle of operation—the fuel is caused to flow slowly through one or more holes of relatively small diameter with respect to the plate or electrode, but relatively large with respect to the micro-droplets of suspended water; then the direction of flow is changed and the fuel is made to flow through a narrow gap between spaced electrodes, the gap width being only a few thousandths of an inch; finally, the resistance of the gap is measured and provides a clue to the water content. It should be stressed that no one of these devices measure the resistivity or the dielectric strength of the fuel, although it might be said that the initial, high resistance reading obtained when fuel starts to flow provides a clue to fuel resistivity. However, the initial reading is ignored or is simply used to provide a 'zero-set'; the reading which is taken being that obtained after a predetermined flow has taken place and, usually, is much lower than the initial reading. This is not a test of dielectric strength as the voltage used is preferably below 10 and often below 3.

The important and remarkable feature of this invention is that, as the fuel flows through the gap at very slow rates, the micro-droplets of water in the fuel apparently build up on the metallic gap electrodes until minute columns of water bridge the gap and permit significant current flow. It seems that the micro-droplets have a strong affinity in the presence of fuel for the metallic surfaces and, when directed thereon by a change in flow direction, stick to the metal and form columns around the periphery of the electrode hole.

Thus, if the device of FIGURES 2 and 2A is adapted to take a 10 mil aviation kerosene sample and has a ¼" electrode hole 15, a larger boss 16 diameter of ⅜" and a gap setting of 0.003", the sample would take about 75 seconds to flow through the gap and an initial resistance well in excess of 100 megohms will usually be obtained. However, the resistance will quickly fall to a more or less steady value of say 50 megohms which, in my experience, can be related to a water content of 10 p.p.m. Calibration curves can readily be obtained by suitable measurements. From an inspection of FIGURES 3 to 7, the same basic principle applies in each case: in FIGURES 3 and 4 the elected fuel sample is by-passed through the holes 56 and the water builds up across the gap 53, in FIGURE 5 the fuel passes through the holes 69 and water builds up in the gap 75, in FIGURE 6 the fuel passes through the holes 94 and 93 and the water builds up in the gap 95, and in FIGURE 7 the fuel passes through the holes 103 and 104 and the water builds up in the gap 109.

It can be seen therefore that a small gap setting of a few thousandths of an inch is essential since the strength of the minute water columns in a large gap may not be sufficient to permit stable columns to form. The sensitivity is therefore partly dependent upon gap setting and in the example shown in FIGURES 2 and 2A the gap is pre-set to an optimum value, while the other examples have adjustable gaps—that of FIGURE 6 measures the water content in terms of the gap required to give a certain reading, while those of FIGURES 3, 5 and 7 merely provide an adjustable pre-set sensitivity.

It follows from the above assumption that sensitivity is also dependent upon the number of holes provided in the electrode plate and, by the use of a large number of holes the sensitivity can be increased to such a degree that it is almost difficult to dry out a fuel sufficiently to avoid a low resistance reading. Thus, in the example of FIGURE 7, the cover ring 105 is screwed into place so as to cover the ring of holes 103 and to thereby reduce the sensitivity of the device—naturally, the ring 105 may be removed when desired.

Although various particular forms of the invention have been described, I do not wish to limit myself strictly thereto as many alterations and additions can be made without departing from the scope of the invention. For example, although with water in kerosene there does not appear to be any significant difference between the use of various metal for the plates, it may be found that the affinity of water for the plate can be enhanced by using other metals or different metals for each plate. Also in the case of the examples shown in FIGURES 2 to 5 some method of clearing the gaps of the accumulated water is necessary in order to obtain repeated or regular readings of water content. Clearance can be effected in a number of ways which may be classed as follows: (a) those which involve the forcing of fuel at abnormal rates through the gap, (b) those which involve the temporary opening of the gap, (c) those which involve the spinning of the electrodes, and (d) those which involve a combination of the other three methods. From a consideration of the principle of operation, such clearance will be seen to be necessary, even if only because of the need to start and take the measurement over a specified time. Otherwise, the water droplets keep building up until an excessively low reading may be obtained. However, calibration over a long period does not show a proportioned build-up of water with time and total gap resistance may still provide a guide to water content even where there is no clearance. The sample testing devices of FIGURES 2 and 6 must, however, be cleared after and/or before each test.

Finally, it is possible to use the device of this invention to detect other water soluable impurities in fuels. This may be done by taking a practically dry fuel, mixing therewith a predetermined quantity of distilled or otherwise pure water and then measuring the resistance obtained which will bear a direct relation to the quantity of such impurities.

I claim:

1. A method of detecting and measuring small quantities of water present in liquid hydrocarbon fuels as a suspension of droplets having a size on the order of a few microns, which comprises passing the fuel through a plurality of passages formed in the first of two detector electrodes, abruptly altering the direction of flow of the fuel through a sharp angle and passing the fuel through a gap between the two detector electrodes, the width of the gap being three thousandths of an inch, applying a voltage across the electrodes, and measuring the electrical resistance of the gap between the two electrodes while the fuel is flowing therethrough.

2. A method of detecting and measuring minute quantities of water present in liquid hydrocarbon fuels as a suspension of droplets the average diameter of which is on the order of a few microns, which comprises passing the fuel through a plurality of passages formed in the first of two metallic detector electrodes, the width of each of said passages being substantially greater than the average diameter of the droplets, abruptly altering the direction of flow of the fuel through an angle of about 90° and passing the fuel through a gap between the two detector electrodes, the width of the gap being three thousandths of an inch, applying a voltage between the two detector electrodes, and measuring the electrical resistance created by linkages formed by build-up of the droplets across the gap between the electrodes while the fuel is flowing through said gap.

3. A method of detecting and measuring small quantities of water present in liquid hydrocarbon fuels as a spsension of droplets having a size on the order of a few microns, which comprises flowing the fuel through an unrestricted flow path having a large size in relation to the droplet size, abruptly altering the direction of flow of the fuel through a sharp angle and at the same time passing it into a restricted flow path having a width of three thousandths of an inch, applying a voltage across the restricted flow path, and measuring the electrical resistance of the fuel in the restricted flow path while the fuel is flowing therein.

4. Apparatus for detecting and measuring small quantities of water present in liquid hydrocarbon fuels as a suspension of droplets of water in the fuel, which comprises a pair of electrically insulated detector electrodes having a space between them, one detector electrode having at least one passage formed therein, the passages being in communication with the space between the electrodes and being disposed at an abrupt angle thereto, the width of the space being three thousandths of an inch, means coupled to the electrodes for applying a small voltage across the electrodes, and means coupled to said voltage applying means for measuring the electrical resistance across the space between the electrodes while fuel in flowing through said space.

5. An apparatus as claimed in claim 4 in which the detector electrodes are adjustable relative to each other for changing the width of the space between the electrodes.

6. Apparatus for detecting and measuring small quantities of water present in liquid hydrocarbon fuels as a suspension of droplets of water in the fuel, which comprises a pair of electrically insulated detector electrodes having a space between them, one detector electrode having a plurality of passages formed therein, the passages being in communication with the space between the electrodes and being disposed at an abrupt angle thereto, the width of the space being three thousandths of an inch, means coupled to the electrodes for applying a small voltage across the electrodes, and means coupled to said voltage applying means for measuring the electrical resistance across the space between the electrodes while fuel is flowing through said space.

7. An apparatus as claimed in claim 6 and a cover on said apparatus movable toward and away from the said one detector electrode and having a size which covers a portion of the plurality of passages in said one detector electrode for blocking flow through said passages from the outside of the electrode into the space between the electrodes.

8. An apparatus for detecting and measuring small quantities of water present in liquid hydrocarbon fuels as a suspension of droplets of water in the fuel, said apparatus comprising a body, said body being in two parts, said parts each being a detector electrode, the parts of said body being spaced from each other and being electrically insulated from each other, one part of said body having a plurality of passages therein, the passages being in communication with the space between the electrodes and being disposed at an abrupt angle thereto, the width of the space between the parts of said body being three thousandths of an inch, means coupled with the parts of the body for applying a small voltage across the electrodes, and means coupled to said voltage applying means for measuring the electrical resistance across the space between the parts of the body while fuel is flowing through the space, whereby when the body is placed in a stream of flowing fuel, fuel will flow through said passages and into the space between the body parts and the resistance drop across the flowing fuel can be measured to determine the build-up of droplets in the space and the amount of air in suspension in the fuel.

9. An apparatus as claimed in claim 8 in which further comprises a pipe on which said body is mounted, said pipe extending through the body, said one part of the body being on the extreme one end of said pipe and the other part of the body being on said pipe spaced from said one part of said body in a direction toward the other end of said pipe, and a closed casing in which said pipe is positioned with the other end of the pipe extending through the casing and the pipe having apertures therein between the casing and the body on the pipe, and said casing having an opening therein for discharging fluid therefrom.

10. An apparatus as claimed in claim 8 in which said one part of said body is torpedo-shaped and said one part of said body has a blunt end facing outwardly of the body and has the passages therethrough converging towards the longitudinal axis of the body as they extend from the outside of the body to the space between the parts of the body, and the other part of said body has a tapered end extending in the opposite direction from the blunt end of the one part, whereby when the body is placed in a stream of flowing fuel with the blunt end facing upstream, fuel flows through said passages and into the space between the parts of the body.

11. An apparatus for detecting and measuring small quantities of water present in liquid hydrocarbon fuels as a suspension of droplets of water in the fuel, said apparatus comprising a container, a pair of electrically insulated detector electrodes mounted in said container and enclosing one end of the container, said electrodes having a space between them, one electrode having a passage formed therein, the passage being in communication with the space between the electrodes and being disposed at an abrupt angle thereto, the width of the space being three thousandths of an inch, means coupled to the electrodes for applying a small voltage across the electrodes, and means coupled to said voltage applying means for measuring the electrical resistance across the space between the electrodes while fuel is flowing through said space.

12. An apparatus as claimed in claim 11 in which said passage in said one electrode is substantially in the center of the electrode and opens into the closed end of said container and said other electrode has a plurality of passages therethrough around the periphery of the electrode and opening into the other end of said container, the other end of said container also being closed, and said one end of the container having an aperture opening into it and the other end of said container having an aperture opening into it.

13. An apparatus as claimed in claim 11 in which said passageway in said one electrode is in the center of the electrode and also opens out of said container, and said other electrode has a plurality of passages therein around the periphery thereof and opening into the closed end of said container around the periphery of the electrode.

References Cited by the Examiner

UNITED STATES PATENTS

| 2,656,508 | 10/1953 | Coulter | 324—71 |
| 2,769,140 | 10/1956 | Obenshain | 324—30 |
| 2,786,977 | 3/1957 | Blagg et al. | 324—30 |

FOREIGN PATENTS

| 81,966 | 7/1956 | Netherlands. |

WALTER L. CARLSON, *Primary Examiner.*

JAMES W. LAWRENCE, *Examiner.*

J. P. O'BRIEN, C. F. ROBERTS, *Assistant Examiners.*